Jan. 2, 1951 J. R. FREEZE Re. 23,316

BACKING SHOE HOLDER FOR SPIRAL PIPE MACHINES

Original Filed Feb. 17, 1948 3 Sheets-Sheet 1

INVENTOR.
JONATHAN ROY FREEZE,
BY Allen & Allen
ATTORNEYS.

BACKING SHOE HOLDER FOR SPIRAL PIPE MACHINES

Original Filed Feb. 17, 1948 3 Sheets-Sheet 2

INVENTOR.
JONATHAN ROY FREEZE.
BY Allen & Allen
ATTORNEYS.

BACKING SHOE HOLDER FOR SPIRAL PIPE MACHINES

Original Filed Feb. 17, 1948 3 Sheets-Sheet 3

INVENTOR.
JONATHAN ROY FREEZE.
BY Allen & Allen
ATTORNEYS.

Reissued Jan. 2, 1951

Re. 23,316

UNITED STATES PATENT OFFICE 23,316

BACKING SHOE HOLDER FOR SPIRAL PIPE MACHINES

Jonathan Roy Freeze, Middletown, Ohio, assignor to Armco Steel Corporation, a corporation of Ohio Original No. 2,501,845, dated March 28, 1950, Serial No. 8,758, February 17, 1948. Application for reissue September 21, 1950, Serial No. 186,059

4 Claims. (Cl. 219—6)

Matter enclosed in heavy brackets [ ] appears in the original patent but forms no part of this reissue specification; matter printed in italics indicates the additions made by reissue

This invention relates to a machine for making spiral welded pipe from flat rolled metal, and more especially to [an electrode] *a backing shoe* holder therefor and to its associated mechanisms. The details of the machine and method are disclosed and claimed in a copending application in my name, Serial No. 101,883, filed June 28, 1949, and constituting a division of the present application.

Spiral welded pipe has been made from flat rolled metal for a number of years and such pipe has been more or less commercially successful. For example, pipe has been made commercially for many years in accordance with the teachings of my earlier Patents Nos. 1,793,281 and 1,793,282, dated February 17, 1931, but the manufacture of pipe in accordance with the principles therein set forth has always been attended by a great many difficulties.

It is an object of my invention to provide [an electrode] *a backing shoe* holder for a machine of the class described, which holder is conveniently adjustable longitudinally of its support, and which may also be conveniently adjusted by tilting the front or rear end thereof. Another object of my invention involves the provision of means whereby the adjustments mentioned above may be performed easily even though stock is wound around the bending knee during the formation of pipe, whereby the [electrode] *backing shoe* holder itself is inaccessible.

The foregoing and other objects of the invention which will be discussed in more detail hereinafter, or which will be apparent to one skilled in the art upon reading these specifications, are accomplished by that certain construction and arrangement of parts of which the following is an exemplary embodiment. Reference is made to the drawings forming a part hereof, and in which.

Throughout these specifications I have used the word "stock" to designate the flat rolled metal which is formed into a helix and welded to produce the finished pipe.

Figure 1:
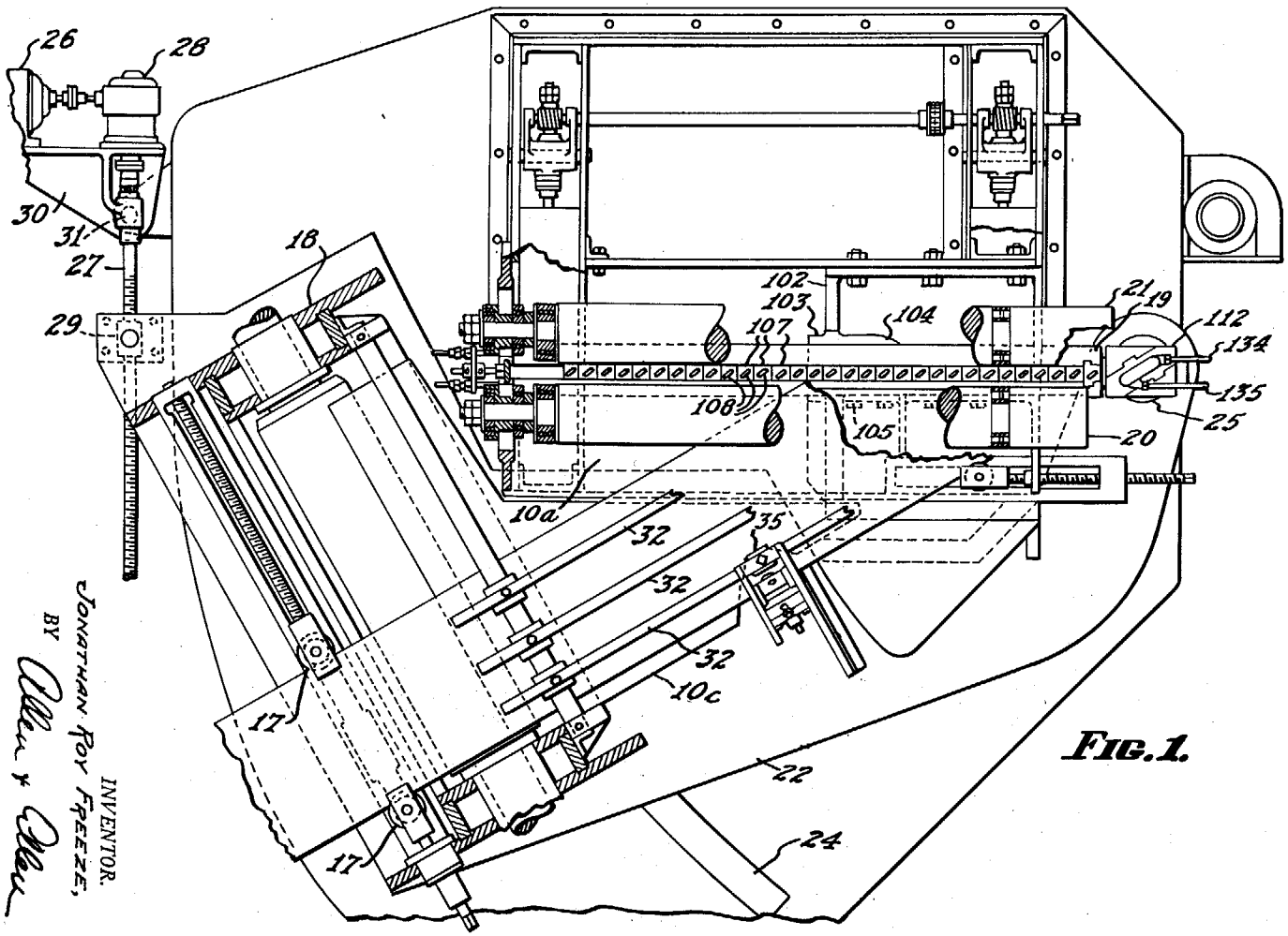
Figure 1 is a fragmentary plan view of the machine with parts broken away and other parts removed for clearer understanding.

The general layout of the machine and the relation of the [electrode] *backing shoe* holder thereto, are best seen in Figure 1.

Passing between a pair of edge guide rollers 17 the stock passes through the driving roll unit indicated generally at 18. It is the unit 18 which thrusts the stock into the forming mechanism where it is formed into a helix.

When the stock issues from the driving unit 18 it is moving in a substantially horizontal plane and in order to enter the forming mechanism it must ride up an inclined plane as indicated at 10a. The forming means comprises essentially a fixed bending knee indicated generally at 19 and the heel roller 20 and buttress roller 21. The stock passes over the knee 19 and under the rolls 20 and 21. Since the stock enters the forming mechanism at an angle, the forming means bends the stock to form it into a helix, and as a convolution is formed its rear edge comes to a position adjacent the forward edge of the entering stock, and substantially at this point the weld is made.

The portion of the machine thus far described, is mounted on a frame indicated generally at 22, which frame is provided with casters (not shown) riding on the curved tracks 24, and the entire unit and the frame 22 is swung about the pivot point 25 to produce the desired helical angle. This is accomplished by means of a motor 26 driving the screw 27 through the gear reducer 28. The screw 27 engages to a nut 29 which is a part of the swingable frame. The motor, gear reducer and screw are mounted upon a bracket 30 which is pivoted at 31, and it will be clear that the motor 26 in turning will cause the feed unit to be moved in an arcuate path about the pivot point 25.

Having thus described in a more or less general way the machine as a whole, certain individual features thereof will now be described in more detail. As was pointed out above, the stock in passing from the driving rolls 18, to the forming mechanism, moves over the inclined plate 10a. The bite between the heel roll 20 and the bending knee 19 is not parallel to the bite between rolls 18. Both of these bites are, however, in horizontal planes, so that normally the stock between the rolls 18 and the forming mechanism would have to be twisted. This difficulty is avoided as follows: the inclined plate 10a is secured adjacent to the bending knee 19 and its lower edge 10b is parallel to the axis of the bending knee. It overlies the horizontal plate or table 10c over which the strip is fed from the driving mechanism 18. The stock thus passes over two plane surfaces 10a and 10c, which are disposed at an angle to each other with the line of intersection of said planes being parallel to the axis of the forming mechanism. In order to confine the stock and to cause the bend in the stock to occur substantially as described, a number of hold-downs 32 are provided. These hold-downs are of varying length so that their ends lie substantially on the intersection of the planes described. By these means the stock is caused to be bent along a line substantially parallel to the axis of the forming mechanism so that the forming operation is accomplished without twisting.

When stock which is initially flat transversely of its length is formed into a helix it is characteristic that the edge of the stock will turn up a small amount in an upward direction so that the welded pipe will be characterized by an upstanding swell following along the seam. In order to overcome this difficulty I provide an edge counterbending mechanism at 35, which is described in detail and claimed in my said copending application.

The construction of the bending knee will now be described:

Generally speaking the bending knee 19 is a cylindrical member which at one end is supported by and welded to a side frame member. Adjacent its other end (the delivery end) the knee is supported by means of a bracket 102 having a semi-cylindrical cradle 103 which has a helical edge 104. The knee is secured to the cradle by means of bolts 105. The helical edge 104 is, of course, provided to permit the strip to be coiled about the bending knee.

Longitudinally of the knee at the top there is a slot in which are seated a series of blocks 107 each carrying a small roller 108. It will be understood that a series of blocks 107 is provided for each helical angle at which the entering stock is to be fed. When it is desired to change helical angles the entire set of blocks 107 are removed and another set having rolls at the appropriate angle is inserted. The rollers 108 support the entering stock as it passes over the bending knee.

The bending knee is also provided with the longitudinal grooves 110 whose purpose will be described below. The exit end has a portion of reduced size as indicated at 111 which serves as a support for the saddle for the [electrode] *backing shoe* holder indicated generally at 112.

Passing through the longitudinal grooves 110 are the tubular members 113 which are threaded into the saddle member 112 as indicated at 114. The tubes 113 are connected up by a strap member 115 which is perforated for the passage of the tubes and the tubes are secured in position by lock nuts 116. The strip member 115 has a central perforation 117 for the passage of a sleeve member 119 formed with a turret head 120. The strap member is confined against the turret head 120 by a collar 121 secured to the other end of the sleeve 119. The sleeve 119 is internally threaded for the passage of the stud 118 secured to the machine frame.

Figure 2:
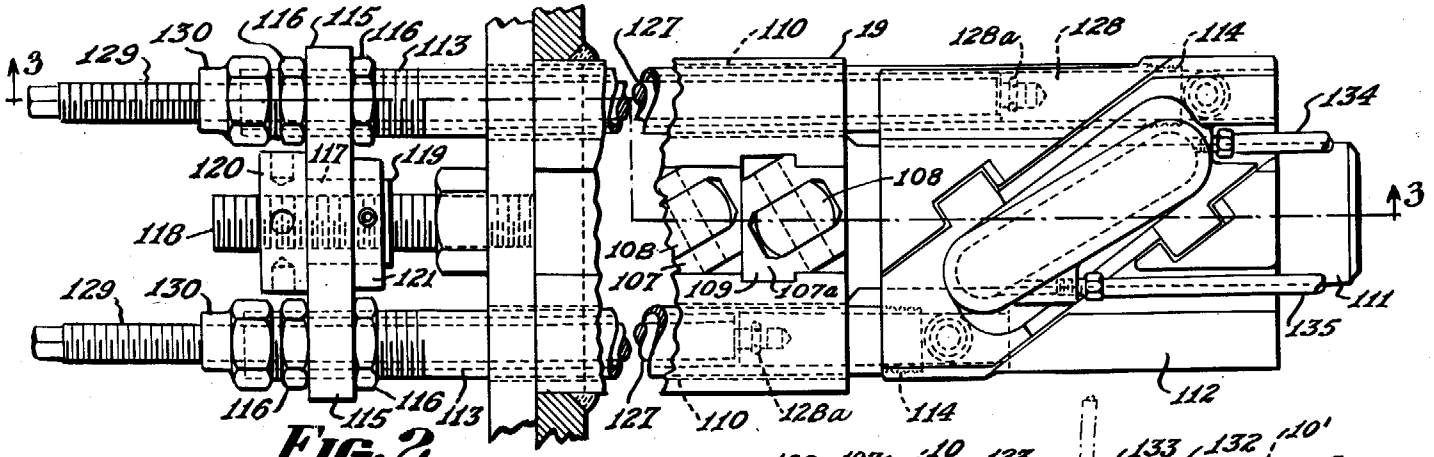
Figure 2 is an enlarged plan view showing details of the bending knee and the [electrode] *backing shoe* holder.

From the foregoing description it will be understood that when the turret head 120 is rotated the strap 115 will be moved to the left or right of Figure 2, carrying with it the tubes 113 and thereby the saddle 112.

The saddle 112 is provided with a recess 122 within which the [electrode] *backing shoe* holder rests upon inverted cup shape members 124 placed over the upper ends of the helical springs 125. The lower ends of the springs 125 are retained in cup members 126. Passing through the tubular members 113 are the rods 127 to the ends of which are secured by means of a universal coupling indicated at 128a the wedge shaped elements 128 which are arranged to underlie the cups 126. At their other ends the rods 127 are threaded as at 129 and engage in the nuts 130 secured to the ends of the tubes 113.

Figure 3:
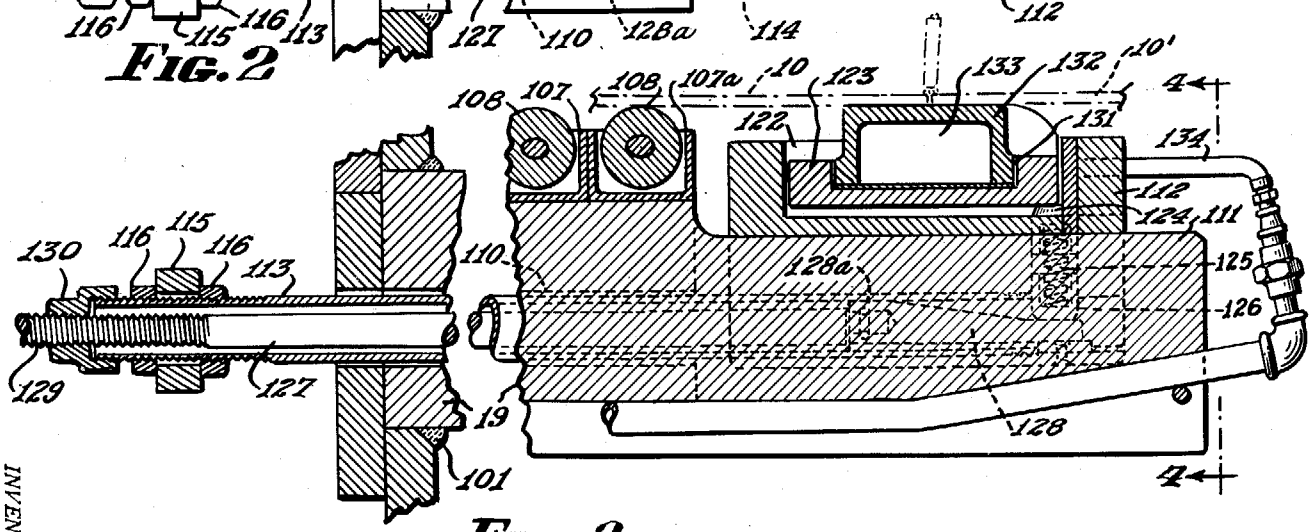
Figure 3 is a sectional view taken on line 3—3 of Figure 2.
Figure 5:
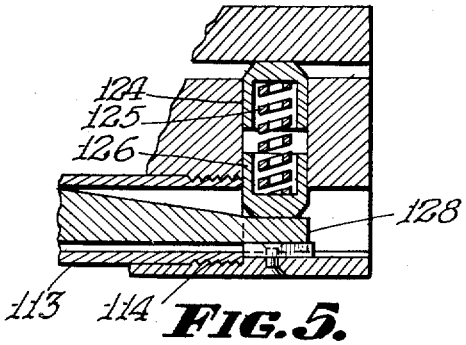
Figure 5 is a fragmentary sectional view taken on the line 5—5 of Figure 4.
Figure 4:
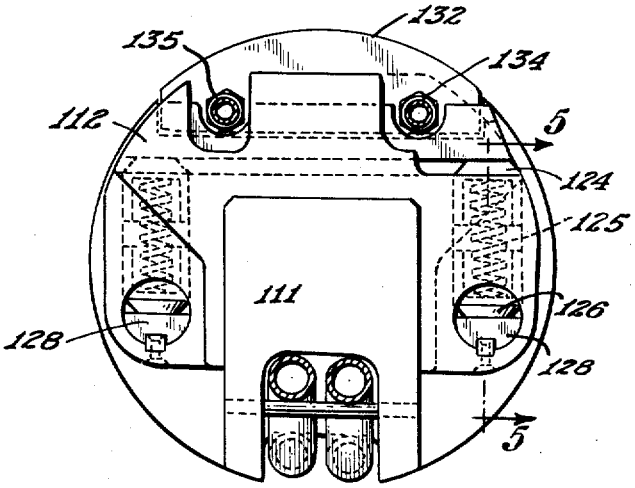
Figure 4 is a sectional view taken on the line 4—4 of Figure 3 and slightly enlarged.

From the foregoing it will be clear that rotation of the rods 127 will cause the wedge shaped portions 128 to be moved toward the right or left of Figure 3, causing the [electrode] *backing shoe* holder 123 to be raised or lowered. From a consideration of Figure 2 it will be clear that the construction just described is duplicated for the other end of the [electrode] *backing shoe* holder so that the front or rear end of the [electrode] *backing shoe* holder may be raised or lowered as required.

The [electrode] *backing shoe* holder is provided with a recess 131 within which the [electrode] *backing shoe* proper 132 is seated. The [electrode] *backing shoe* is hollow as at 133 and a flexible water connection indicated generally at 134 is provided for a coolant to pass through the [electrode] *backing shoe* and be withdrawn therefrom by a flexible connection 135.

The completed and welded pipe passes out through an exit guide arrangement (not shown) the primary purpose of which is to fix the exit direction of the pipe to facilitate subsequent handling. In connection with the exit guide the usual cut-off device may be provided, if desired.

The actual welding head and its associated mechanisms are not described in detail as they form no part of the present invention.

Only so much of the complete machine has been described and shown as is necessary to an understanding of the operation of the [electrode] *backing shoe* holder and its adjustments. The details of the machine are fully described and claimed in my said copending application to which reference is hereby made.

While certain aspects of the invention have been described in considerable detail, this has been primarily by way of illustration. Many modifications may be made in details of construction without departing from the spirit of the invention.

Having now fully described the invention, what I claim as new and desire to secure by Letters Patent is:

1. In a machine for making spiral welded pipe from metal stock, having a bending knee about which said stock is formed into a helix with substantially meeting stock edges, an extension on the exit end of said bending knee, [an electrode] *a backing shoe* holding member mounted on said extension for sliding movement axially of said knee, and means extending longitudinally through said knee for positioning said member from the entrance end of said knee.

2. A mechanism according to claim 1, in which [an electrode] *a backing shoe* is mounted in said holding member at an angle to the axis of said knee, the ends of said [electrode] *backing shoe* being yieldingly supported at its ends, and means are provided for selectively raising or lowering said ends.

3. A mechanism according to claim 2, in which said raising and lowering means comprise inclined planes underlying said ends, and rods passing through said knee for actuating said planes, whereby the position of said [electrode] *backing shoe* may be controlled from the entrance end of said machine.

4. A mechanism according to claim 3, in which the means extending longitudinally through said knee for positioning said member are hollow, and said rods pass through said hollow means.

JONATHAN ROY FREEZE.

REFERENCES CITED

The following references are of record in the file of this patent or the original patent:

UNITED STATES PATENTS

| Number | Name | Date |
|---|---|---|
| 375,435 | Alden | Dec. 27, 1887 |
| 781,355 | Peavey | Jan. 31, 1905 |
| 1,018,291 | Beadle | Feb. 20, 1912 |
| 1,288,134 | Naylor | Dec. 17, 1918 |
| 1,649,613 | Olson | Nov. 15, 1927 |
| 1,659,754 | Thorsby | Feb. 21, 1928 |
| 1,711,524 | Foreman | May 7, 1929 |
| 1,793,281 | Freeze | Feb. 17, 1931 |
| 1,793,282 | Freeze | Feb. 17, 1931 |
| 1,822,984 | Watkins | Sept. 15, 1931 |
| 1,875,560 | Cammen | Sept. 6, 1932 |
| 1,922,380 | Lucas | Aug. 15, 1933 |
| 1,929,415 | Force | Oct. 10, 1933 |
| 2,062,875 | Gardner | Dec. 1, 1936 |
| 2,115,859 | Harford | May 3, 1938 |
| 2,115,925 | Force | May 3, 1938 |
| 2,339,219 | Crowley | Jan. 11, 1944 |

FOREIGN PATENTS

| Number | Country | Date |
|---|---|---|
| 25,939 | Germany | Oct. 10, 1906 |
| 131,949 | Germany | July 26, 1902 |
| 582,501 | Germany | Oct. 23, 1933 |